United States Patent
Skovby et al.

(10) Patent No.: US 9,963,387 B2
(45) Date of Patent: May 8, 2018

(54) PROCESS FOR THE PREPARATION OF CEMENT, MORTARS, CONCRETE COMPOSITIONS CONTAINING A CALCIUM CARBONATE—BASED FILLER (PRE)—TREATED WITH A SUPERPLASTICIZER, COMPOSITIONS AND CEMENT PRODUCTS OBTAINED AND THEIR APPLICATIONS

(71) Applicant: Omya International AG, Oftringen (CH)

(72) Inventors: Michael Skovby, Meilen (CH); Pascal Gonnon, Villeneuve (FR)

(73) Assignee: Omya International AG, Oftringen (CH)

(*) Notice: Subject to any disclaimer, the term of this patent is extended or adjusted under 35 U.S.C. 154(b) by 137 days.

(21) Appl. No.: 14/805,722

(22) Filed: Jul. 22, 2015

(65) Prior Publication Data
US 2016/0016850 A1    Jan. 21, 2016

Related U.S. Application Data

(63) Continuation of application No. 13/813,977, filed as application No. PCT/IB2011/001927 on Aug. 23, 2011, now Pat. No. 9,133,056.

(60) Provisional application No. 61/414,508, filed on Nov. 17, 2010.

(30) Foreign Application Priority Data

Aug. 24, 2010 (EP) .................... 10008803

(51) Int. Cl.
| C04B 14/28 | (2006.01) |
| C04B 20/10 | (2006.01) |
| C04B 24/04 | (2006.01) |
| C04B 24/22 | (2006.01) |
| C04B 28/02 | (2006.01) |
| C09C 1/02 | (2006.01) |
| C04B 111/62 | (2006.01) |

(52) U.S. Cl.
CPC .......... *C04B 14/28* (2013.01); *C04B 20/1029* (2013.01); *C04B 28/02* (2013.01); *C09C 1/021* (2013.01); *C01P 2004/61* (2013.01); *C04B 2111/62* (2013.01)

(58) Field of Classification Search
CPC ....... C09C 1/00; C04B 14/28; C04B 20/1033; C04B 24/04; C04B 24/22; C04B 24/223; C04B 24/226; C04B 28/02
USPC ...................... 106/802, 809, 810
See application file for complete search history.

(56) References Cited

U.S. PATENT DOCUMENTS

| 4,753,679 A * | 6/1988 | Damiano ............... C04B 28/02 106/460 |
| 6,828,382 B1 * | 12/2004 | Loth .................. C09D 133/062 156/330.9 |
| 2003/0004246 A1 | 1/2003 | Wache et al. |
| 2008/0287554 A1 * | 11/2008 | Gittins ...................... C09C 1/02 516/9 |
| 2009/0255443 A1 * | 10/2009 | Francis ................. C04B 28/147 106/708 |

FOREIGN PATENT DOCUMENTS

| EP | 0099954 A1 | 2/1984 | |
| FR | 2815627 A1 | 4/2002 | |
| FR | 2815628 A1 | 4/2002 | |
| WO | 9408913 A1 | 4/1994 | |
| WO | WO 1995015930 A1 * | 6/1995 | |
| WO | 0158994 A1 | 8/2001 | |
| WO | 07057510 A1 | 5/2007 | |
| WO | 2008068322 A1 | 6/2008 | |
| WO | WO 2008068322 A1 * | 6/2008 | ............ C04B 14/28 |
| WO | 08107790 A1 | 9/2008 | |

OTHER PUBLICATIONS

"Chemical Admixtures". PCA. Apr. 5, 2004. Retrieved from https://web.archive.org/web/20040405195939/http://www.cement.org/basics/concretebasics_chemical.asp.*
"Aggregates". PCA. Apr. 5, 2004. Retrieved from https://web.archive.org/web/20040405193221/http://www.cement.org/basics/concretebasics_aggregate.asp.*
"Fluid Premia 180". Chryso. http://chryso-india.cn/upload/t_documents/Fichier_L2/42910/FT_CHRYSOFluid_Premia_180_GB.pdf.*
Civil Engineering Dictionary.
(Continued)

*Primary Examiner* — Helene Klemanski
(74) *Attorney, Agent, or Firm* — Amster, Rothstein & Ebenstein LLP

(57) ABSTRACT

The invention concerns a PROCESS for the preparation of cement/mortar/concrete (for simplicity: "cement") compositions or systems, (hereafter "cement" compositions or systems for simplicity), of a general known type, in which the filler(s) is/are comprising or consist of "calcium carbonate-based filler(s)", comprising at least one step where the said filler(s) is/are treated with an efficient treating amount of at least one treating agent consisting of or comprising superplastifier(s). The main purpose of this invention is to build a process aimed at providing improved, "High performance", FLUID, cement or mortars or concrete systems or compositions having an improved compacity, an improved flowability, and globally speaking a definitely improved "workability", and "regularity" of the properties of the final systems. The present invention also concerns a filler for "cement" compositions, characterized in that if consists of, or comprises, a calcium-carbonate-based filler or blends of same, pre-treated with an "efficient amount" of at least one superplastifier.

17 Claims, 6 Drawing Sheets

(56) References Cited

OTHER PUBLICATIONS

The International Search Report dated Jan. 17, 2012 for PCT Application No. PCT/IB2011/001927.
The Written Opinion of the International Searching Authority dated Jan. 17, 2012 for PCT Application No. PCT/IB2011/001927.
El Barrak et al. "Self-compacting concrete paste constituents: hierarchial classification of their influence on flow properties of the paste." Cement & Concrete Composites, vol. 31, No. 1 (2009), pp. 12-21.
Nunes et al. "Interaction diagrams to assess SCC mortars for different cement types." Construction and Building Materials, vol. 23 (2009), pp. 1401-1412.
Mikanovic et al. "Influence of superplasticizers on the rheology and stability of limestone and cement pastes." Cement & Concrete Research, vl. 38, No. 907 (2008), p. 919.

* cited by examiner

PROCESS FOR THE PREPARATION OF CEMENT, MORTARS, CONCRETE COMPOSITIONS CONTAINING A CALCIUM CARBONATE—BASED FILLER (PRE)—TREATED WITH A SUPERPLASTICIZER, COMPOSITIONS AND CEMENT PRODUCTS OBTAINED AND THEIR APPLICATIONS

CROSS-REFERENCE TO RELATED APPLICATIONS

This is a continuation of U.S. application Ser. No. 13/813,977, filed Mar. 18, 2013, which is a U.S. National phase of PCT Application No. PCT/IB2011/001927, filed Aug. 23, 2011, which claims priority to European Application No. 10008803.8, filed Aug. 24, 2010, and U.S. Provisional Application No. 61/414,508, filed Nov. 17, 2010, the contents of which are hereby incorporated by reference.

TECHNICAL FIELD OF THE INVENTION

The present invention relates to the field of cement compositions, cementitious compositions, hydraulic binders compositions, mortar compositions, concrete "compositions" (or hereafter equivalently "systems"), namely of the type compositions (or "systems") of cement/hydraulic binders, mortars, concrete, containing at least one particulate mineral of the calcium carbonate(s) type as a filler, and their applications, as well as the corresponding cement, mortar, concrete products or elements, the said filler being "upgraded" according to the invention to a "technical" or "high performance" ("HP") level of performance due to a process which is the essential part of the invention.

The invention relates to a specific process for producing the said compositions or "systems" (those terms are going to be used as equivalents in this application and claims) for cement, hydraulic binder, mortar, concrete, the obtained compositions, the cement, mortars and concrete products obtained therefrom, and their applications.

PRIOR ART

It is reminded that a cement system (or equivalently "composition") is a system comprising cement particles, mixing water (or equivalently a mixing aqueous composition not interfering with the said system, as known to the skilled man), filler(s), various optional and usual additives such as air entrainment agents, setting retarders, setting accelerators and the like, and any such routine additives as well known to the skilled man.

A mortar system additionally contains an inert aggregate material, usually a sand.

A concrete system still additionally contains gravel.

The above is abundantly known and common knowledge.

As a matter of simplicity, and also because the invention relates to the use of additives adapted to improve or "upgrade" the properties of any of those three systems, the terms "cement systems" (or "compositions") will be used in the following to encompass ANY of the above three main kinds of compositions or "systems", that is a cement, cementitious, hydraulic binder, mortar or concrete composition or system. The skilled man will be able to appreciate if the system is a cement, a mortar or a concrete composition in view of the presence, or the absence, of sand and/or gravel. This simplification is made possible since sand and gravel are inert materials, and therefore do not noticeably interfere with the invention.

It is also pointed out that, even if, in the following, an information is provided regarding "cement systems" for example, it ALSO applies mutatis mutandis to any of the four other kinds of systems. The only difference between the systems being the presence, or not, of sand and/or gravel.

In such compositions, fluidifier(s) is/are often used.

In that domain, the EP 0 663 892 to CHRYSO is certainly the most relevant document, which discloses fluidifier polymers for mineral suspensions with no hydraulic setting, or hydraulic binders slurries.

Cited applications are paper coating, paints, and synthetic resins or rubber compositions.

According to the said prior art, it was known to add fluidifiers in mineral, particular suspensions to lower their viscosity, and, especially for paper applications, this leads to high mineral concentrations, a better workability, and this reduces the drying energy. For example, this is used in connection with suspensions of calcium carbonate.

It is also known to add such fluidifiers to "cement" (in the wide sense explained hereabove) slurries, with the purpose this time of reducing their water content and to obtain a "cement" composition with a "more dense structure" after setting.

Encountered problems are: the influence of electrolytes, which reduces the fluidifying effect and forces to increase the amount of fluidifier (with an increase in cost), as well as, for "cement", the need not to negatively alter the setting characteristics of the cement composition not its final properties.

Some well-known fluidifiers are superplastifiers or plastifiers.

In that domain, the EP 0 663 892 to CHRYSO is relevant, as well as FR 2 815 627, FR 2 815 629 and WO2008/107790 which also disclose interesting superplastifiers.

Some known fluidifiers affect less the setting time, but are still unsatisfactory, such as condensation products of sulfonated naphtalene and formaldehyde or melamine-formaldehyde with a sulfonated compound. Some of those products are also superplastifiers, but much less preferred.

Also, EP 0 099 954 relates to fluidifiers made by condensation of amino-sulfonic acid comprising at least an aromatic ring with nitrogenated compounds bearing several amine functions and formaldehyde.

Such are said not to delay too much the setting of cement compositions, but they are highly sensitive to electrolytes when it comes to their "activity". They also can be obtained with low concentrations, usually no more than about 40% by dry weight, since any concentration increase in turn increases their viscosity to inadmissible levels.

The summary of the desired properties is listed page 3 lines 15 ff of the above-mentioned EP.

It is also known to add filler(s) in cement, hydraulic binders, cementitious or concrete or mortars compositions or "systems".

The purpose of adding such filler(s) is to fill the voids between particles, to reduce the overall costs, and to greatly improve a property called "consistency" (consistency being the capacity or ability for the considered systems to easily flow or "self-level", or not) and a property called "compacity" (that is the percentage of dry material in the final composition (the higher the percentage, the better the compacity)).

In the present invention, the said usable filler(s) is/are defined as "calcium carbonate-based filler(s)" that is, in this application and claims, contain(s) only calcium carbonate(s) (possibly of various origins, such as various natural rocks or various PCCs) which means with no other filler of a different type, such as kaolin, bentonite, etc. known to the skilled man, and is/are preferably provided (when the filler(s) is/are or contain(s) GCC(s)) by a carbonated rock or more generally mineral material(s) comprising at least 50-65% by weight (dry) of $CaCO_3$, preferably more than 80%, still more preferably more than 90%; those filler(s)s are selected among:
- natural calcium carbonate(s) or ground calcium carbonate(s) (GCC(s)) such as, non limitatively, GCC from marble, chalk, calcite, or from other natural and well-known forms of natural calcium carbonates which preferably meet the above % criteria;
    - PCC(s) which is a precipitated calcium carbonate, and exists under various well-known forms, depending on the well-known precipitation/preparation process.
    - or a mixture of said $CaCO_3$-containing rocks or mineral materials with each other as well as blends or mixtures of GCC(s) and PCC(s).

The GCC/PCC ratio can be chosen from 0-100 to 100-0% by dry weight, preferably from 30-70 to 70/30% by dry weight.

Usually a "filler" has the following properties:
- Purity (methylene blue test) is lower than 10 g/kg, preferably below 3-5 g/kg, preferably below 1-1.5 g, with a most interesting value at 1.2 g/kg.
- Mean diameter or $d_{50}$ is about in the range of 1-3 to 30-50 micrometers measured by using the Malvern 2000 PSD equipment/methodology.
- Blaine surface, which is a characteristic feature of FILLERS, as is well-known, is in the domain of 180-2000 $m^2/kg$, preferably of 300 to 800 $m^2/kg$, as measured under an EU Standard (European standard EN 196-6).

As is known, a "cement" (in the above mentioned wide sense) composition or "system" is mainly made of:
Cement (or cementitious composition or hydraulic binder)+mixing water (or mixing aqueous composition allowing setting but not interfering with the system)+optionally (usually inert) particulate and/or fibrous filler(s)+inert agglomerate(s) such as optionally sand+optionally inert gravel (plus optionally well known additives not to be mentioned in detail nor in full in the present application, such as setting accelerators, setting retarders, air entrainment agents, etc. ... )+miscellaneous "routine" additives aimed at matching the precise need of the end-user.

Aggregates such as sand, inert gravel or "all-in" aggregates are known materials so commonly used that no description is needed here.

As discussed above, the invention relates also equivalently (under the generic term "cement" for simplicity) to mortars compositions or "systems" (like above including an aggregate like sand but no gravel) and cement compositions (same as above but no gravel and no sand).

"Mainly" means here that the system may contain some impurities or traces of additives or adjuvants, not to be mentioned in the present application, such as air entrainment agents, accelerators, retarders, etc.

"Mixing water" will mean in this patent application plain mix water or aqueous mixing compositions, that is mainly water plus usual additives, allowing the normal setting of the "cement" compositions, without interfering with the other properties of the overall composition, or only, via the additives, to improve some usual properties.

"Fillers" in this invention have been precisely defined hereabove, that is fillers containing under any known form (namely GCCs and/or PCCs), only $CaCO_3$ particulate material, plus optionally some other inert filler particles or fibrous material such as hemp etc., BUT no other type of filler such as kaolin, bentonite etc., and their various blends.

In this whole application and claims, "inert" shall mean a material which has no noticeable (or negligible) impact or interference with the process of the invention and the obtained compositions, products and applications. Given the involved ingredients, this will be easily appreciated by any skilled man.

The prior art "cement" (in the wide sense as defined above) systems to date are therefore mainly made of:
Cement (or hydraulic binders or cementitious compositions)+mixing water (or mixing aqueous compositions not interfering with the system)+optionally aggregate(s) such as sand+optionally gravel+FILLER(s)+"routine" additives.

It is also known that cement/hydraulic binders/cementitious compositions, cements, mortars and concrete compositions can be basically sorted out into:
DRY systems (poor quality or "low") (casting is performed with high vibration and energy).
PLASTIC systems (medium quality) (medium vibration and energy).
FLUID systems (High performance or "HP") (low vibration and low energy).

A very simple test is used to classify the systems, using a "mini cône à chape" known as "self-levelling test" or "screed flow cone test".

The test is well known and is conducted as follows, according to the recognized Standard EN 196-1; the said standard defines accurately the mixer or kneading (also malaxing) device to be used, the speed of rotation, and each and every such data useful for reproducing the test. Therefore, no more explanations or definitions are needed here for the sake of clarity or reproducibility.

For simplification, "cement" will encompass in this whole application not only cement material, but also cementitious compositions and hydraulic binders (other than cement) compositions, and their blends. As indicated above, it also encompasses corresponding mortars and concretes.

Self Levelling Test:
Basically, a cement or mortar or concrete "system" is prepared by mixing the above ingredients according to usual practice, recalled here-below in more detail though the process conditions are well known, then is poured in accordance with the above Standard conditions, into an inverted cone which is perforated at its bottom (dimensions are also given by the said Standard as well as each and every useful data of the test). The cement or mortar or concrete system therefore flows into and out of the said cone, namely through its bottom aperture, and falls onto an horizontal plate to form a "chape" ("screed").

It there forms a "galette" or "cone" also known as "dry to plastic form" whose diameter is measured, and aspect visually inspected for example for stickiness and "thickness", the latter property reflecting a "slow" or "viscous" mix, that is, if "thick", hard to handle.

The larger the diameter, the more flowable the system. For a given high consistency, as targeted by the invention, this is the major test.

Given the quality of the initial filler to be used in the concrete system, namely its place of production, morphology etc. the resulting cone will vary in diameter, this indicating a variation in flowability.

As an example, a GCC which is known to use no or almost no mixing water, and shows such valuable properties, will lead to a very fluid, non-sticky cement or concrete composition. Such a composition will be fully usable for "technical" (that is, "high performance" or "HP") concrete compositions, called "FLUID" above.

If to the contrary, the filler namely GCC filler absorbs or uses a noticeable amount of water, or contains some impurities, etc. the resulting composition will be less fluid and become to be somewhat sticky. The end user will be forced inter alia to either add a corrective adjuvant (with an associated extra cost and an associated risk of secondary effect of the composition as a whole) and/or add extra water (thus being detrimental to consistency and inducing associated risks). Those compositions will be used for medium quality compositions, called "PLASTIC" hereabove.

At the other end of the ladder, using a filler namely a GCC of poor quality will lead to a composition which will exit the mixer under the form of sticky granulates. Those will be used only for DRY concrete compositions, NOT part of the invention.

The test will be sufficient for a skilled man to rate the starting GCC and/or PCC (s). The same is valid mutatis mutandis when using a PCC or a GCC/PCC blend.

In order to provide the skilled man with useful guidelines and information about the meaning of "low", "medium" or "HP" filler, we attach the TABLE A where ten fillers A to K of various origin and morphology (as indicated for characterization by the skilled man) have been tested for various properties and qualities, or drawbacks, with the classification "low" "medium" or "HP" being added on each line.

or compositions having a improved compacity (% of dry material, the highest possible), an improved flowability (that is forming a non sticky "galette" or "cone" of large diameter in the above described test, the larger the diameter, the better flowability), and globally speaking a definitely improved "workability" (workability being the ability of the cement or concrete composition to be prepared, processed, handled, and used to form a high performance or "technical" concrete) and a far better "regularity" in the final product properties especially at the end user level. Clearly, some of those desired properties are antagonistic, and for example one should expect a high % dry material to perform poorly in a flowability test.

Technical Problem(s) to be Solved

The main purpose of this invention is to build a process aimed at providing improved, "High performance", FLUID, cement or mortars or concrete systems or compositions having an improved compacity (percentage of dry material, the highest possible), an improved flowability (that is forming a non-sticky "galette" or "cone" of large diameter in the above described test, the larger the diameter, the better flowability), and globally speaking a definitely improved "workability" (workability being the ability of the cement or concrete composition to be prepared, processed, handled, and used to form a high performance or "technical" cements, mortars or concrete compositions or systems).

TABLE A

Characterization of "low", "medium", "HP" fillers and their aspect

| Treatment Agent Code | geological designation (age) | Type | d50 | Blaine | Blue (Methylene Blue Test) | (3 g) | (4 g) | Evaluation | visual evaluation |
|---|---|---|---|---|---|---|---|---|---|
| A | white chalk facies (90 Mi) | chalk | 1.0 | >1400 | 2.0 | plastic aspect | 220 | low | slow, very thick |
| B | white chalk facies (90 Mi) | chalk | 2.2 | 1120 | 2.7 | 280 | 340 | medium | thick |
| C | urgonian facies (115 Mi) | calcite | 3.1 | 1171 | 0.3 | 200 | 290 | low | slow, thick |
| D | bioclastic facies (160Mi) | calcite | 6.0 | 720 | 1.0 | plastic aspect | 338 | medium | plastic |
| E | urgonian facies (115 Mi) | calcite | 6.5 | 395 | 0.3 | 460 | 475 | HP | fluid |
| G | upper jurassic (130 Mi) | marble | 17.0 | 363 | 0.3 | dry aspect | 365 | medium | slow, heavy |
| H | upper jurassic (120 Mi) | marble | 13.4 | 385 | 0.3 | 337 | 413 | low | slow, viscous |
| I | H + 5% B | X | X | X | X | 190 | 390 | medium | slow, viscous |
| J | H + 15% B | X | X | X | X | 427 | 436 | HP | fluid |
| K | H + 20% B | X | X | X | X | 340 | 410 | medium | fluid, thick |

One uses 3 g or respectfully 4 g of superplastifier Premia 196 commercialised by the Firm CHRYSO, and which is a commercial product at a concentration of 25.3% by weight (dry extract measured along the Standard EN 480-8), by DRY weight of cement.

In the said Table A, "+15% B" evidently means an addition of 15% of the product B, to form a blend or mix, the % being in DRY WEIGHT/DRY MIX WEIGHT.

Equally, columns "3g" and "4g" means that 3 or respectfully 4 g of the said superplastifer have been added by DRY weight of the cement component alone.

"Mi" means "million years" (dating of the rock)
"Blue" means "methylene blue test" (purity test)

This introduction of this application clearly points out to the need for improved cement or mortar or concrete systems Another property, which does not exists in the prior art, while the industry is strongly demanding it, is "regularity" of the properties of the final systems.

It has been surprisingly found according to this invention, that that set of objectives can be reached by treating the filler(s) in the specific manner as disclosed below, with only minute amounts of treating agents, and with a very impressive technical effect.

BRIEF SUMMARY OF THE INVENTION

The invention resides first in a PROCESS for the preparation of the above defined cement/mortar/concrete compositions or systems, (for simplicity hereafter "cement" compositions or systems), of a general known type as defined hereabove containing filler(s), in which the filler(s) is/are comprising or consist of "calcium carbonate-based filler(s)" as defined hereabove, characterized in that it comprises at least one step where the said calcium-carbonate-based filler(s) is/are treated with an efficient treating amount of at least one treating agent consisting of or comprising superplastifier(s).

The treatment is believed to treat only the calcium carbonate(s) part of the filler(s), and for example not the other particulate or fibrous fillers, IF ANY, believed to be inert in this process.

This preferred option or best mode will be named "pre-treatment" or equivalently (in the Tables 1-6 which correspond to LABORATORY experiments where the fillers are pre-treated in a small laboratory mixer) "initial" mode.

To be noted that the "Lödige" tests mentioned in the same Tables are also pre-treatment tests according to the invention, but performed in an INDUSTRIAL and well-known kneading or mixing device, called Lödige equipment.

By "comprising or consisting of" we mean that the fillers may consist of calcium carbonate(s), optionally mixed with non interferring fillers, and that the treating agent(s) can be: only superplastifier(s) or blends of superplastifier(s) with non-interfering plasticizer(s) (as defined herebelow) and/or routine, inert, additives.

By "efficient treating (or "treatment") amount" or "efficient surface coverage of the fillers particles or grains" or "efficiently treated", we mean in this application that at least 50%, preferably at least 60, or better at least 80 or 90% or still better closer to 100% of the surface of the particles of the filler(s) have been subjected to a physico-chemical interaction with the superplastifier(s). This physico-chemical interaction is not entirely understood as of the filing date, only the EFFECTS and RESULTS are duly identified and correlated to the treating superplastifier(s), but, without being tied by any theory, the applicant considers that the said interaction or "treatment" is a surface treatment or "surface-covering" treatment involving ionic, physical, mechanical and/or chemical, treatment(s) and via said interaction(s). This efficient treating or treatment amount must therefore be important enough to treat the said % of particle surfaces, as will be explained and disclosed in more detail below.

By "surface-covering" we mean that the superplasticizers are supposed by the applicant, without being tied by a theory, to engage in electrical charge potential interactions with the ionic charges of the surface of the filler, which promotes the fixation of the superplastifier onto and/or closely around the surface and so reduces the "accessible" surface of the particle having no surface saturation of the grain by said treatment.

This corresponds to an "UNblocking" of the particles or grains, what first "triggers" then promotes the mobility freedom of the particles with respect to each other.

This is NOT a fluidification process: this is a "trigger action" leading to an UNblocking process or sudden removal of interparticle interference/friction without which the rest of the properties cannot be reached and especially not the required fluidity.

It is believed that this so "triggered" "Unblocking" function is one of the very key parameters allowing to appreciate the appropriate "treatment" or "surface coverage". By "comprising" we mean in this application that the treating agent can be made only of superplastifier(s) (one or more mixed together, preferably one) or of blends of superplastifier(s) displaying mutual non-interference (that is, unable to noticeably degrade the above "treatment") amount or proportion of known plasticizer(s) for the purpose of cost-saving, as explained in greater detail here-below.

1. According to the best mode of the invention, as defined to date, the said filler(s) is/are efficiently treated before being introduced in the kneading or mixing device ("pre-treatment" also named "initial" in the Tables 1-6), such as in an outside mixing Laboratory equipment; in the industrial scale, such a pre-treatment can be performed in an industrial device such as the Lödige mixer or any other industrial kneading or mixing equipment known to the art.

2. According to a less preferred embodiment, the said filler(s) is/are treated after having being introduced in the kneading or mixing device ("inside treatment"). In such a case, the said filler(s) is/are efficiently treated after having being introduced in the kneading or mixing device ("inside treatment") with the filler(s) and the efficient treating amount of the treating agent(s) being introduced in the kneading or mixing device either simultaneously or in a manner such that the filler(s) and the efficient amount of the treating agent(s) are introduced separately BUT at a very close location and time.

3. According to another embodiment, the said filler(s) is/are efficiently treated partially before being introduced in the kneading or mixing device ("partial pre-treatment") (such as in a well-known Lödige equipment) and partially after having been introduced in the pre-treated state in the said mixing or kneading device, the total of the two partial treatments being "efficient" in terms of treatment, surface coverage etc. as defined above. ("mixed treatment"), with the second part or amount of the treating agent(s) being introduced in the kneading or mixing device either simultaneously with the pre-treated fillers or in a manner such that the pretreated filler(s) and the second part of the treating agent(s) are introduced separately BUT at a very close location and time.

When the filler(s) is/are to be treated at least partially inside the kneading or mixing device, ("mixed treatment"), the skilled man will understand that a corresponding amount or proportion of treating superplastifier(s) has to be added directly into the said kneading or mixing device or in admixture with the considered filler just before the introduction in the kneading or mixing device, in the latter case, for example, on the weighting device ("balance") which is provided just before the powdered products are introduced into the kneading or mixing device. "Just before" will be easily understood as a place and time where the filler(s) and treating agents cannot or have no time to be mixed together, what would induce the beginning of the treatment. A good example is the balance where the two powders are placed together then almost immediately introduced, with no previous kneading or mixing, into the kneading or mixing device. It is much preferred that the point and time of introduction of the said proportion of treating agent be as close as possible to the point and time of introduction of the partially treated filler(s), so as not to be diluted in the pre-existing products already present in the mixing or kneading device (such as sand, gravel, mix water, optionally routine additives, so that the treating agent be fully available for the filler(s).

This is also true in relation with the option "inside treatment".

In both options, actually, if the filler is added at a location and at a time too far form the location and time of the treating agent, whatever the order of introduction, one could shift to a treatment which would be too late: this would actually make possible for the treating agent to be "consumed" by other ingredients before the filler is introduced, or, in the case of a filler introduced first, lead to a late treatment that is the "post-ajout" mode in Tables 1-6 ("post-addition" of the treating agent(s) a certain time after the filler has been introduced; as will be see from the Tables 1-6 and FIGS. 1-6, the results are far lower than with a pre-treatment, a mixed treatment or an inside treatment according to the invention).

Any post ajout has to be avoided.

The invention also covers an industrial option characterized in that at least a portion of the efficient amount of treating superplastifier(s), or the totality of the said efficient amount, is mixed with the filler(s) on the weighting device ("balance") leading to the kneading or mixing device. This can be regarded either as a simultaneous addition, or a "near-simultaneous" addition.

It is also possible to envision a process of the invention in which a portion of the filler(s) is efficiently "pretreated" and a second portion of the fillers is efficiently treated "inside" the kneading or mixing.

Some of the above options are evidently complicated and/or require additional equipments or modifications of the existing equipment. They are therefore far less preferred, the "pretreatment or initial mode being the most preferred.

The "best mode" to date to avoid those drawbacks is clearly to prepare a pre-treated filler then to deliver it to the end user and to introduce it as such into the kneading or mixing device, most preferably after the mix water and sand and gravel, if any, have been introduced and allowed to be successively malaxed as is usual in this industry (the difference being that, in the present invention, the filler is TREATED, while it is NOT in the prior art).

The invention also covers such a
pre-treated "calcium carbonate-based filler(s)" as a novel industrial product,
to be delivered to the end user that way, optionally after any treatment allowing to ease the transportation.

It is known, in Laboratory trials, and due to the small volumes or loads involved, to sometimes first place some small amount of "fluidifiers" in the bottom of the laboratory mixing device: some of those fluidifiers may be superplastifiers, many are not.

However, even when some small amounts of superplastifiers-"fluidifiers" are present, they cannot "treat" the fillers "efficiently" as in the invention, that is according to the definition given hereabove. They merely act as fluidifiers, so that they interact mainly with the other first constituents of the load, such as sand, gravel, mix water etc., which are malaxed together, alone, for a given period of time, so as to conveniently fluidize the particles or aggregates in the suspension; in this operation, they are "fixed" or "consumed" by the said aggregates particles that precisely need to be fluidized. If they were not, there would be no fluidification. Therefore, they are then no longer available for the fillers; even if, to be absolutely complete, we assume for a second that some (mandatorily very small amount) such fluidifier were quite partially and quite marginally available, it could only quite marginally interfere with the filler, that is in any case absolutely not with the "efficient" treatment effect or "surface coverage" effect or "unblocking" effect generated by the superplastifiers deliberately added in the present invention at a moment and at a time such as to reach the point of "efficient treatment". Simply, the necessary "threshold" or "TRIGGER" for Unblocking could not be reached by far, and, with no "trigger", there could be no "Unblocking" at all. No prior art ever reported any improvement or upgrading which might have a relation with the fluidizers (many of fluidizers being additionally just plastifiers, not superplastifiers); no doubt that, especially in an R&D Laboratory, if such an upgrading had been noticed, it would have been reported. This is simply because the "trigger" effect for "unblocking" never occurred.

In the industrial scale, one most generally uses NO fluidifiers, or in some exceptional cases in minute amounts, and in order to "fluidize" the mix: there again, the fluidifiers are "used" to fluidify sand, gravel, etc. and are not available for the fillers, and therefore can in no way "trigger" the "unblocking" of the system, the essential part of the invention.

As indicated hereabove, the said filler(s) are made of calcium carbonate(s) or blends thereof, that is mainly GCCs or PCCs or blends of GCCs or blends of PCCs or blends of GCCs and PCCs.

The invention also resides in the said "CEMENT COMPOSITIONS" (in the wide sense defined above) and their USE, and in the "CEMENT ELEMENTS or PRODUCTS" so obtained from the said compositions, and their USE in the "cement" industries.

By "CEMENT ELEMENTS or PRODUCTS" it is meant in this whole application each and any piece of building or construction (or any piece or product for any other industrial purpose known to the skilled man, including off-shore cementing, or oil wells cementing, using "cement" compositions) prepared from the said compositions.

This will be detailed herebelow.

DETAILED DESCRIPTION OF THE INVENTION

Figure 1:
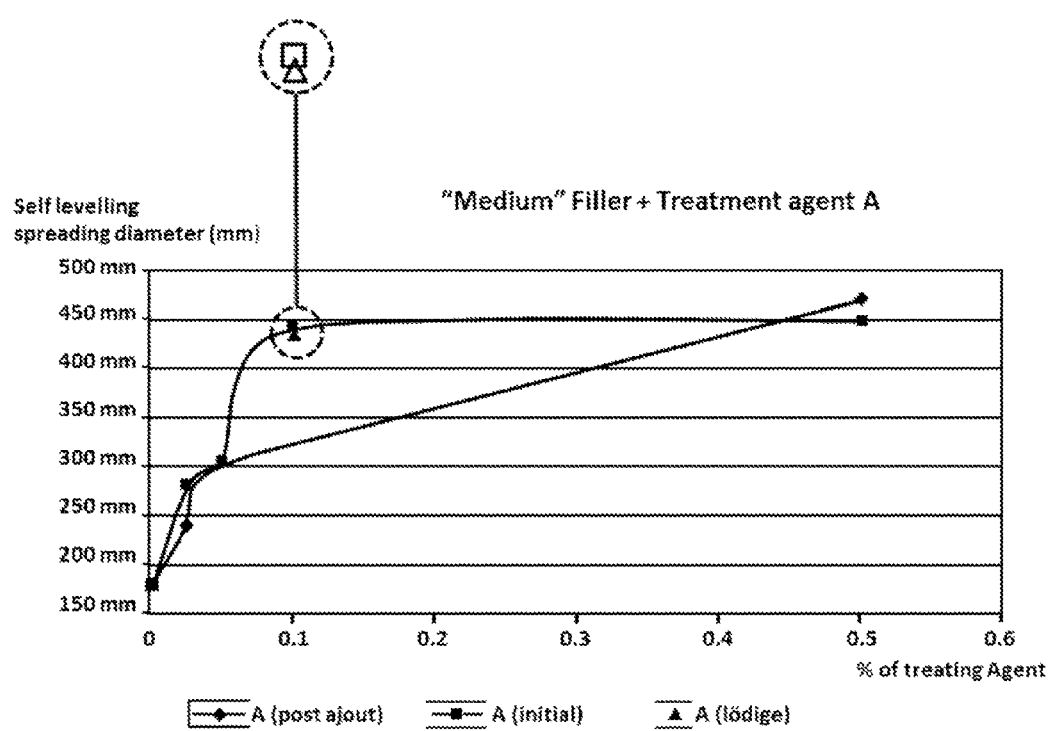
FIG. 1: correspond to a surface treatment with the superplastifier A described above at a dosage of such as expressed in the corresponding Table 1.

In a detailed and most preferred ("best mode" as of today) embodiment, the said PROCESS for preparing the said "cement" compositions or systems is characterized (in the so-called "pre-treatment" or (in the Tables 1-6 namely) equivalently "initial" mode) by a) providing a powder of dry calcium carbonate(s) filler as defined above as "calcium carbonate(s)-based filler", hereafter "filler or filler(s);

b) mixing the said filler(s) with an efficient treating amount of at least one superplastifier, thus producing "pre-treated filler(s)", c) introducing the said pre-treated filler(s) into a kneading or mixing device already containing mix water or a composition of mix water possibly containing routine or "non-interfering" additives ("mix water composition") (hereafter for simplicity "mixing water")
d) optionally adding before or after the step c), preferably before, aggregates such as sand and/or gravel, and possibly other "non interfering" routine additives or adjuvants,
e) kneading or mixing the said load during an efficient period of time,
f) recovering the said "cement" composition.

By "not interfering", it is meant not interfering or not noticeably with the said considered treatment or inventive process.

By "efficient period of time", it is meant a total period of time leading to an homogeneous mixture or blend, in the order of 2-15 min, preferably, for the "standard" mixtures or blends, 30-60 s. This will be detailed hereafter.

An example of end-user application is as follows: if the end user targets medium or "standard" properties for its final cement composition, for example with a final mixing within his facilities in a fixed installation etc., he will use compositions which are correspondingly simple that is not specifically complex or sensitive in terms of routine additives, superplastifier, filler etc; therefore, the end user will have to mix for a relatively short time such as the above 35-65 s.

If to the contrary the end user targets high-level or very HP properties, he will use correspondingly more complex compositions and more sensitive components, for example a more sensitive filler or superplastifier, or sensitive routine additives aimed at reaching a specific property, etc. . . . and usually he will use less or far less mixing water: therefore he will need to mix for a much longer time such as the above 1-3 to 10-15 min.

Evidently, "technical" composition or system means a "HP" quality (see the "Self levelling test" section above) or "FLUID" see above too, and by contrast a "standard" final composition means a "non-HP" quality, that is, see above, "dry" or more likely "plastic".

In both cases, that is "technical" or "standard" compositions, and as explained in the present application, the common objective is to reach a homogeneous composition, also as explained specifically in the present application, see below "The main essential crieteria . . . final product must be homogeneous".

The above working principals are well known to the skilled man and are for completeness only. The above values and examples are to provide guidelines only, which the skilled man will be able to easily use in order to meet the essential "main criteria".

One will understand that it is impossible to provide examples or data for any type of ultimate composition or ingredient, since the interactions are complex, so are the kinetics etc. . . . but the skilled man knows about those parameters.

According to a less preferred mode, the said PROCESS for preparing the said "cement" compositions or systems is characterized in the "mixed-treatment" mode by
a) providing a powder of dry calcium carbonate (s) filler as defined above
b) mixing the said filler(s) with a portion or part of an efficient treating amount of at least one superplastifier, thus producing the partially pre-treated filler (s),
c) introducing the said partially pre-treated filler(s) into a kneading or mixing device already containing mix water or a composition of mix water possibly containing routine additives ("mix water composition") (hereafter for simplicity "mixing water")
d) introducing before or during step c), preferably during, into the said kneading or mixing device, the rest of the said efficient treating amount or proportion of the superplastifier(s)
e) optionally adding before or after the steps c) and d), preferably before, aggregates such as sand and/or gravel, and possibly other routine additives not interfering with the said treatment,
f) kneading or mixing the said load during an efficient period of time
g) recovering the said "cement" composition.

According to still another embodiment, the said PROCESS for preparing the said "cement" compositions or systems is characterized in the "inside-treatment" mode by
a) providing a powder of dry calcium carbonate (s) based filler(s) as defined above
b) introducing the said un-treated filler(s) into a kneading or mixing device already containing an efficient treating amount of at least one superplastifier, (or receiving it just after the introducing of the said un-treated filler(s)) mix water or a composition of mix water possibly containing routine additives ("mix water composition") (hereafter for simplicity "mixing water")
c) kneading or mixing the said load during an efficient period of time
d) optionally adding before or after the step c), preferably before, aggregates such as sand and/or gravel, and possibly other routine additives or adjuvants, not interfering with the said treatment,
e) recovering the said "cement" composition.

By "just after" it is meant that the treating agent can be introduced before of after the un-treated filler(s), bur in the second case it must be introduced rapidly after the filler(s), say, in a matter of some seconds to 10 s or so, in order for the filler to remain fully available for the treating agents without any disturbance due to the kneading or mixing with sand, gravel etc.

It is usually most preferred to first introduce the aggregates such as sand and gravel into the kneading or mixing device, and mix them optionally with a small amount of water and/or of fluidifier (see above), before performing the other steps.

As treatment agent, is used at least one superplastifier (and possibly at least one superplasticizer with possibly some inert amount of plasticizer).

According to the above definition of the treating agent, the so called treating agents for the fillers consist of/or comprise superplastifier(s), or comprise at least one superplastifier (and optionally at least one plastifier in order to reduce the overall costs), and preferably consist of at least one superplastifier and optionally at least one efficiently cost-reducing amount of plastifier, and most preferably one superplastifier and optionally one efficiently cost-reducing amount of a plasticizer.

Superplastifiers are well-known agents and are to the best selected among the following products or families and their blends:
Polycarboxylates, polycarboxylate ethers, or much less preferred products manufactured from sulfonated naphthalene condensate or sulfonated melamine formaldehyde. The skilled man knows these products, which are additionally disclosed in the prior art as cited above.

In this invention, the best mode treating agents (product A and product B) appear to be, in the superplastifiers families, of the polycarboxylate ether formulae.

To be noted, the products codes A to K in Table A are FILLERS to be characterized, NOT to create a confusion with the preferred treating agent(s) A and B above which are (superplastifiers(s)).

By "efficient period of time" it is meant here a period of time of about 35-65 s for the standard compositions, and from 1-3 to 10-15 min. for the more "technical" that is more complex and/or more sensitive compositions, as is known from the skilled man. For a "standard" composition, an example can be a kneading time of 10-15-20 s for the gravel and sand (dry kneading or mixing is preferred), then of 10 s for the kneading or mixing of the hydraulic binder and untreated filler, then 10-15 s for the kneading or mixing with the treatment agent(s) and mix water (this in the so-called "inside treatment mode"), then 5-15 s for the final kneading or mixing with the final "routine additives".

The main and essential criteria for the said "period of mixing" is that the final product must be homogeneous and the treating agent(s) be not absorbed or adsorbed onto the sand or gravel, or the less possible extent.

By "efficient amount" of plasticizer (when present with the superplastifier) it is meant in this application an amount or proportion of plastifier which is able to reduce the cost of the treatment without interfering negatively with the system and namely the filler(s) behaviour, namely in terms of surface activity and reactivity); the same criteria applies to the "inert additives".

By "comprising" we mean here that the said treatment agents consist essentially or entirely of superplastifier(s) as defined, and may contain as explained a cost-reducing efficient amount of at least one plastifier, and may also contain inert additives useful for the intended final application, such as anti foam agents, retarders, accelerators etc. absolutely known to the skilled man.

Usual additives of inert nature can be added at injection points known to the skilled man, as said earlier.

The mixing or kneading device can be operated in a batch mode, a semi-continuous mode, or a continuous mode, the adaptations being within the easy reach of an average skilled man.

Actually, it has been surprisingly discovered that such superplastifier(s) previously used as mere "fluidifiers" are able to UPGRADE FILLERS from medium, and sometimes from low, to HP grade.

Dosage of Superplastifier(s) Used for the Pre-Treatment and Treatment of the Filler(s)

At the end-user location, the dosage in superplastifier(s) is ranging from 0.3 to 3 kg for 100 kg of cement, preferably 0.8 to 1.2 kg/100 kg of cement, on a DRY/DRY basis.

In laboratory conditions, the same proportion ranges from 0.05 to 0.1% by weight of the carbonate (DRY) that is 0.1 to 0.3 kg/100 kg of cement, on a DRY/DRY basis.

In laboratory conditions, for establishing the Table A, one used from 0.8 to 1.1 kg/100 kg cement, on a DRY/DRY basis.

At the end user location, the ratio superplastifier(s)/plasticizer(s) can be from 100/0 to 95/5-90/10, preferably no less than 85/15 on a weight dry basis.

The invention also resides in the said CEMENT (in the broad sense given above that is cement, cementitious compositions, mortars, concretes) COMPOSITIONS (OR SYSTEMS):
per se, since they are distinguishable from the prior art similar compositions by their physical structure and their properties,
or as prepared by the above process of the invention,
and in the USE of those cement systems or compositions for making concrete elements,
and ultimately in the CEMENT ELEMENTS
per se, since they are distinguishable for the same reasons as the compositions,
and as prepared by using the said compositions.
as well as in the
calcium carbonate-based filler(s) as pre-treated by the pretreatment process of the invention.

Another objective is evidently to meet Client's requirements which are that the "galette" or "cone" be above 250 mm in diameter, most preferably 300 mm, or still better, above 300 mm, at a cost-effective dosage.

Some filler-containing compositions meet that requirement, depending on the origin of the filler. This can be easily and quickly appreciated by a skilled man by performing the cone and plate test.

This test allows therefore to discriminate the fillers and select the best-performing filler and even the best performing superplastifier(s), in view of the final properties required by the end user.

Many do not meet that requirement, certain by far.

Usually (PRIOR ART PROCESS) the test is conducted on an UNtreated filler

In the present application the superplastifiers are used as treatment agents for the filler in a specific and inventive process.

Another objective of the invention is therefore to upgrade medium or low quality, filler-containing, cement/mortar/concrete (for simplicity, "cement") compositions or systems to HP (or high performance) compositions, by introduction in the mixing/kneading device of the said superplastifier(s) and optionally (see above) at least one cost-reducing efficient amount of plastifier(s) in order to improve the behaviour of the filler(s) and therefore of the overall composition.

Plastifiers(s) are selected preferably among those cited above.

Those families are very well known to the skilled man. The merit of the inventors was not to discover those families, nor their use as superplastifiers in the common sense of the prior art, but to discover that one can WIDELY UPGRADE A CEMENT FILLER (and hence the cement compositions) BY TREATING the Calcium Carbonate-based fillers with such species.

It has been noted that certain compositions are so low in cone diameter ("self levelling test"), stickiness, etc. that there is no way to upgrade them; this demonstrates the difficulty of the invention's task.

Some can be upgraded but only by adding large proportions of the superplastifers used according to the invention and even in such cases, the diameter requirement can be matched, BUT the "galette" or "cone" remains sticky and thick in consistency, what means that the result, despite the fact that the diameter of the "galette" is correct, the composition cannot be regarded as upgraded to HP concrete composition.

It is necessary to keep in mind that, for a concrete composition or system to be acceptable as HP composition, or upgraded from low or medium quality to HP quality, TWO features MUST be met simultaneously:
the diameter of the "galette" or cone must be above about 250, or better above 300, or still better above 350 mm, AND
the "galette" or cone must NOT be sticky or thick in consistency.

This is another measurement of the very tough challenge which this invention wishes to overcome, and of the very high technical and scientific input brought by the invention to the current state of the art.

As can be seen from the attached Table A, the "poor" fillers can NOT be upgraded since they never meet BOTH features.

This is also true for some "medium" fillers such as product D, B, G, I and K which may show a good fluidity for example at a dosage of 4 g BUT have a bad aspect or handling behaviour.

With the help of the Table A and of the above and below comments, the skilled man will be able to discriminate the fillers which CAN be upgraded by the invention, and those (regarded as "low" as per the test of the Table A) which can NOT.

To achieve these objectives, the skilled man bears in mind first that a certain water/cement ratio is directly linked to the workability of the composition and that it is also imperative to develop high performance qualities in the end product, such as high performance or "technical" level of setting properties, drying properties, mechanical strength, namely compressive strength etc.

As specified above, the invention relies first on the surface treatment of the $CaCO_3$-based FILLER(s) by one or more superplasticizer(s) (optionally in admixture with one or more plastifier). The amount of plastifier will be calculated easily by the skilled man as being the efficient cost effective amount, not interfering with the overall treatment, see above.

Two superplastifiers products are providing the best results. They are the "best mode" as of the filing date (products A and B of the polycarboxylate ether family) as mentioned above.

It is very surprising to notice that when using the invention, proportions of superplasticizer(s) treating agent(s) for the $CaCO_3$ filler(s) as low as 0.03 or 0.05 to 0.1% are sufficient. It is entirely surprising to notice that such minuscule amounts of treating agents are capable of upgrading to HP quality even medium to poor fillers.

Many such plasticizers, superplasticizers or fluidifiers, are known, such as described for example in the CHRYSO patent EP 0 663 892

Other products have been successfully tested as superplastifiers) usable in the process of the invention to perform a surface treatment of the carbonate filler, such as the CHRYSO™ products described in the above cited EP patent, such as PREMIA 196™, or NRG 100 from Mappei™.

Some usual additives may be routinely added such as air entrainment agents, setting retarders or accelerators etc. at a place which is known from the skilled man, for example with the water or after the superplastifiers are added.

As to the "powders" that is the cement and the filler, the cement can be added first, then the filler, or the reverse, or they can be introduced together as a premix.

It is however preferred to introduce the cement and the filler together as a premix, so as to better ensure that both powders will be homogeneously mixed with and wet with the water.

The above are batch modes.

One can also think of continuous modes such as performing the addition in one of the above orders, for example in a kneading or mixing device equipped with an endless screw (with additions at various points along the length of the equipment), possibly with pre-mixes being added at some point(s), or as another example in a series of successive kneading or mixing devices, also with the possibility of adding premix(es) in one of the devices. It will be obvious to the skilled man that especially the latter option (several kneading or mixing devices) has numerous drawbacks, if only the necessary space and investment.

Batch modes are preferred and will be referred to herebelow.

Routine tests can help the skilled man to select the most appropriate, in view of the available equipment, of the end user practice, and with the help of the following Tables and Figures which are attached to this application.

Figure 2:
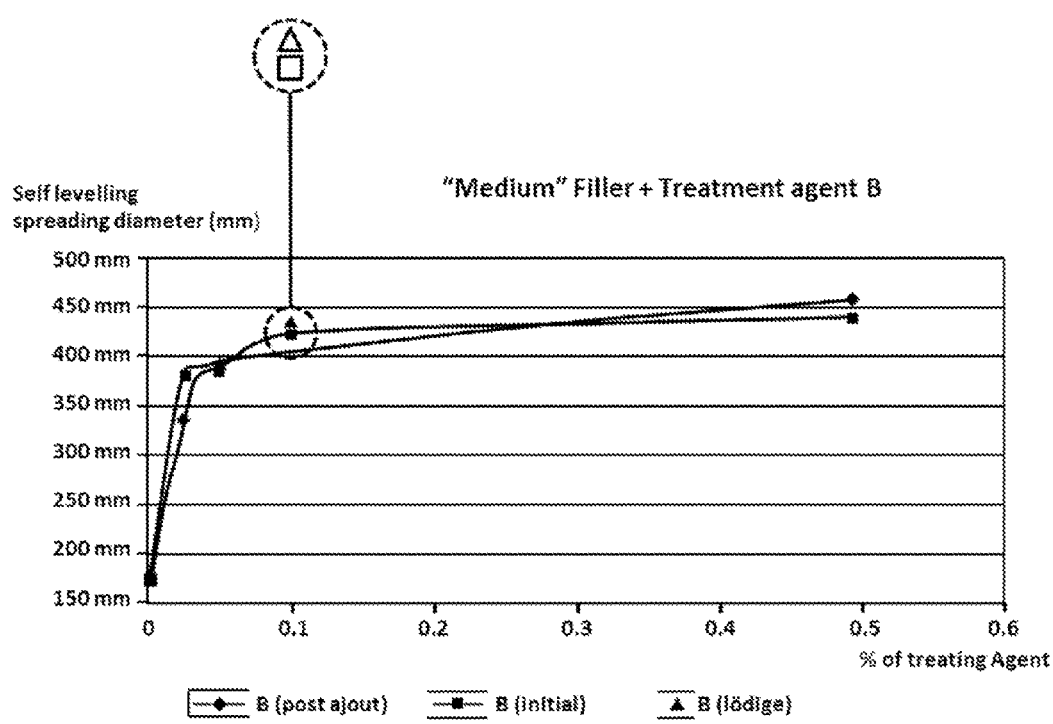
FIG. 2: correspond to a surface treatment with the superplastifier B described above at a dosage of such as expressed in the corresponding Table 2.
Figure 3:
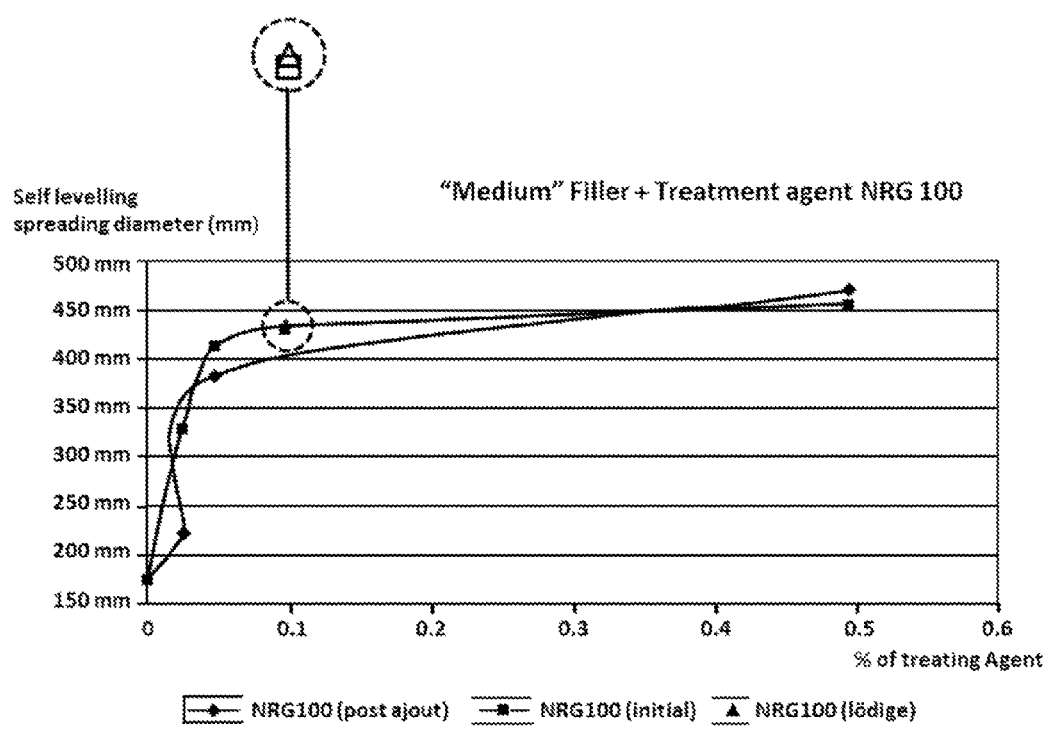
FIG. 3: correspond to a surface treatment by the product NRG 100 at a dosage such as expressed in the corresponding Table 3.

Tables 1, 2 and 3 and FIGS. 1, 2, 3:

In the tables and FIGS. 1, 2 and 3, a "medium" filler has been used, that is leading in the "cone test", to a diameter of 170 mm with no treating agent (left hand column) and to "galette", whose aspect is indicated at the dosage of treating agent equally indicated (dosage is expressed in % by weight of DRY treating agent/$CaCO_3$ by weight, DRY) after the self-levelling process. As discussed above, 170 mm is by far insufficient.

Table 1 and FIG. 1 correspond to a surface treatment with the superplastifier A described above at a dosage of such as expressed in the corresponding Table.

Table 2 and FIG. 2 correspond to a surface treatment with the superplastifier B described above at a dosage of such as expressed in the corresponding Table.

Table 3 and FIG. 3 correspond to a surface treatment by the product NRG 100 at a dosage such as expressed in the corresponding Table.

TABLE 1

| | "Medium" Filler | | | | | | | | |
|---|---|---|---|---|---|---|---|---|---|
| Test N° | 2312/B | 2312/B1 | 2312/B2 | 2312/B3 | 2312/B10 | 2312/B11 | 2248/1 | 2312/B12 | 2312/B21 |
| Treatment Mode | None | post ajout | post ajout | post ajout | initial | initial | initial | initial | lödige 3 min |
| Treatment Agent | None | A | A | A | A | A | A | A | A |
| Treatment Agent dosage - Dosage unit = weight treatment Agent(s) dry/ weight Calcium Carbonate(s) dry | x | 0.025% | 0.05% | 0.5% | 0.025% | 0.05% | 0.1% | 0.5% | 0.1% |
| "Galette" = diameter obtained in the self-levelling cone test | 170 mm | 238 mm | 306 mm | 477 mm | 280 mm | 308 mm | 442 mm | 451 mm | 435 mm |
| Result Visual Aspect | D1 Plastic aspect but do not spread | C1 Homogeneous aspect | B1 Plastic aspect | A1 Liquid// Fast Spreading | C1 Homogeneous aspect | B1 Plastic Aspect | A1 Fluid | A1 Fluid | A1 Fluid |

TABLE 2

| Test N° | 2312/B | 2312/B4 | 2312/B5 | 2312/B6 | 2312/B13 | 2312/B14 | 2312/B15 | 2312/B16 | 2312/B22 |
|---|---|---|---|---|---|---|---|---|---|
| | | | | | "Medium" Filler | | | | |
| Treatment Mode | None | post ajout | post ajout | post ajout | initial | initial | initial | initial | lödige 5 min |
| Treatment Agent | None | B | B | B | B | B | B | B | A |
| Treatment Agent dosage - Dosage unit = weight treatment Agent(s) dry/ weight Calcium Carbonate(s) dry | x | 0.025% | 0.05% | 0.5% | 0.025% | 0.05% | 0.1% | 0.5% | 0.1% |
| "Galette" = diameter obtained in the self-levelling cone test | 170 mm | 335 mm | 395 mm | 457 mm | 382 mm | 390 mm | 425 mm | 441 mm | 437 mm |
| Result Visual Aspect | D1 Plastic aspect but do not spread | B1 Plastic aspect | A1 Fluid | A1 Liquid// Fast Spreading | A1 Fluid | A1 Fluid | A1 Fluid | A1 Fluid | A1 Fluid |

TABLE 3

| Test N° | 2312/B | 2312/B7 | 2312/B8 | 2312/B9 | 2312/B17 | 2312/B18 | 2312/B19 | 2312/B20 | 2312/B23 |
|---|---|---|---|---|---|---|---|---|---|
| | | | | | "Medium" Filler | | | | |
| Treatment Mode | None | post ajout | post ajout | post ajout | initial | initial | initial | initial | lödige 5 min |
| Treatment Agent | None | NRG100 | NRG100 | NRG100 | NRG100 | NRG100 | NRG100 | NRG100 | NRG100 |
| Treatment Agent dosage - Dosage unit = weight treatment Agent(s) dry/ weight Calcium Carbonate(s) dry | x | 0.025% | 0.05% | 0.5% | 0.025% | 0.05% | 0.1% | 0.5% | 0.1% |
| "Galette" = diameter obtained in the self-levelling cone test | 170 mm | 220 mm | 383 mm | 465 mm | 328 mm | 413 mm | 432 mm | 451 mm | 435 mm |
| Result Visual Aspect | D1 Plastic aspect but do not spread | C1 Homogeneous aspect | A1 Fluid | A1 Liquid// Fast Spreading | B1 Plastic Aspect | A1 Fluid | A1 Fluid | A1 Fluid | A1 Fluid |

In the three curves of FIGS. 1 to 3, the curve corresponding to an addition of the superplastifier(s) AFTER all the other ingredients (COMPARATIVE, MUCH LESS PREFERRED MODE) is marked with "diamonds" ("post ajout mode" in the Tables) while the "pre-treatment mode" or "initial" (laboratory version of the pre-treatment) curve" of the invention is marked with "squares" ("initial mode" in the Tables).

The "triangle" in the Tables is an isolated point corresponding to a 100% pretreatment of the filler in an outside mixing device as for example LODIGUE, during 3 or 5 min., prior to its introduction in the kneading or mixing device (right hand column in the Tables, 435, 437 and 435 mm for the "galette" in the cone test at only 0.1% dosage).

The said "triangle" is sometimes difficult to notice on the FIGS. 1-6 because it superimposes with squares and/or diamonds, FIGS. 1 to 6 have been split into FIGS. 1a to 6a (curves) and FIGS. 1b to 6b (schematic, enlarged scale showing the approximate location of the superimposed marks).

It was expected that for treating a coarser filler, the amount of adjuvant(s) must be far or significantly higher. Quite surprisingly, the reverse occurs, that is, proportions such as from 0.03-0.05 to 0.1-0.5% are quite efficient.

We surprisingly note on the curves of FIGS. 1 and 2 (and from the % values in the corresponding Tables 1 and 2) the occurrence of a "plateau" at about 0.12% so that it is useless to incorporate more that about 0.1% of adjuvant.

The best range is therefore 0.1%-0.12%

To be noted, the study of the lower part of the curves, namely that related to the treatment with B, shows that a clear technical effect appears at 0.03-0.05%: one can note a very steep increase in diameter (consistency) and this represents a threshold dosage (lower limit of the range) that is where the self-levelling (of the "galette" or cone) requirement of 250-300 mm is reached.

As to table 3 and FIG. 3, one can see that the "initial mode" curve is quite similar to those of FIGS. 1 and 2, that is a very clear "plateau" after 0.1-0.12%-0.20% or so, and a similar steep increase in consistency towards the lower dosages, while the "post ajout" mode curve shows a similar behaviour at the low dosages but (above 0.05% or so) shows a regular but slower increase. For that superplastifier A, one can see that the useful range of dosage in the "initial mode" process is from 0.05% (corresponds to 300 mm consistency) to 0.1-0.12%-0.20% (beginning of the clear "plateau", like in curves 1 and 2); in contrast, with the "post ajout mode" curve, the lower dosage threshold is about the same (the two curves superpose at about 300 mm) while it is necessary to add about 0.3% of product NRG 100 to reach about 425 mm, vs. about 0.1% for the pre-treatment curve, or the Lödige point.

However, one can see that the "initial mode" curve allows to reach a plateau at 450 mm for about 0.1-0.12-0.15% of treating agent A used in the process according to the invention, while B and NRG 100 were, for the same % (and for the "initial mode" curve) at about 425 mm.

One can therefore say that a technical effect appears, depending on the curves and on the desired value of consistency in mm) above 0.02-0.03-0.05% superplastifier(s)/ weight cement (dry), at which point that proportion of adjuvant(s) allows the system to be UNblocked; this is the UNblocking point. This "unblocking point" is probably the key for the unexpected effect of the process of the invention. Therefore, again depending on the adjuvant and on the desired value of consistency, and for THIS filler, one can deduce from the said "unblocking" point that the optimum proportion is at about 0.08-0.1-0.12-0.15% (since a "plateau" follows, so that there is no need to add more of expensive adjuvant, for example no need to go up to 0.5%) AND it is most preferable to use a "INITIAL MODE or "pre-treatment" PROCESS"—that is the process where the superplastifier(s) adjuvant(s) is/are added with (or at the same point of addition as) the filler (that is, the filler is either first pre-treated with the superplastifier adjuvant in a separate equipment like the known LODIGE mixing device (but with no actual better result, see above the "triangle" points) or the superplastifier(s) (and optionally the cost-reducing amount of plastifier(s)) is/are added along with the filler since it can be seen from the drawings FIGS. 1, 2 and 3 that the "initial mode" or "pretreatment" curve is always better than the "post ajout mode" curve (that is when the treating agent is added after all the major ingredients including after the filler(s)).

It could even be risky to add more than the optimum 0.1-0.12-0.15% adjuvant/cement since there would be too much of adjuvants and therefore free polymer (that is free adjuvant) would remain in the system. The said excess of adjuvant (free polymer) could interact with cement, with other additives etc. and would be likely to unbalance the system.

Figure 4:
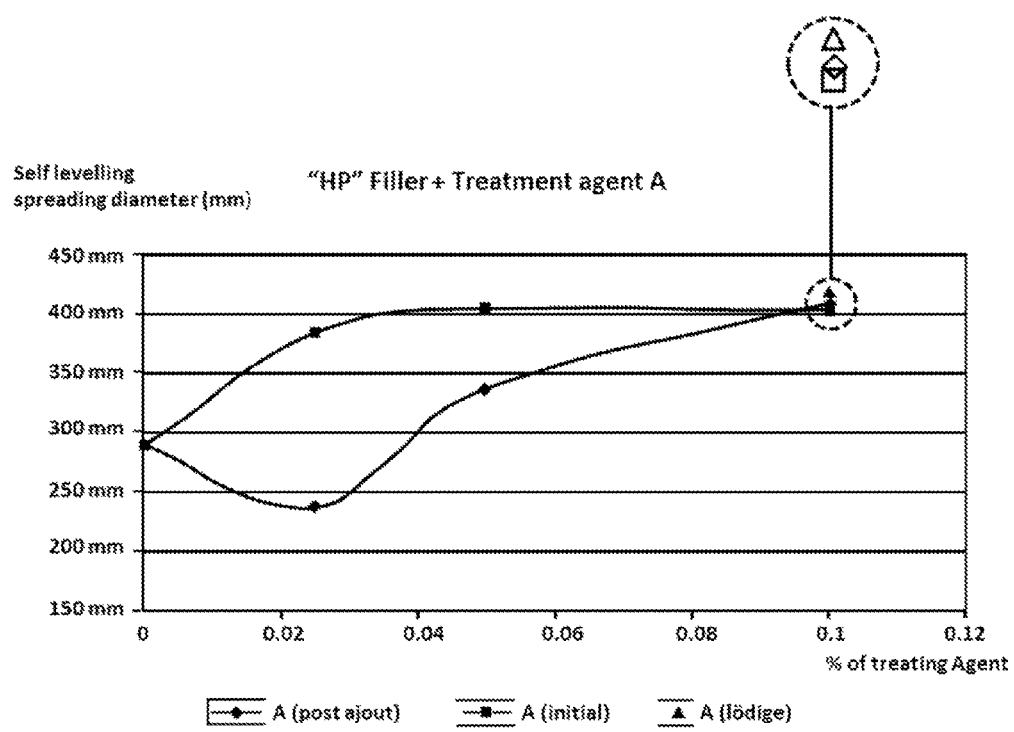
FIG. 4: correspond to a surface treatment with the superplastifier A described above at a dosage of such as expressed in the corresponding Table 4.
Figure 5:
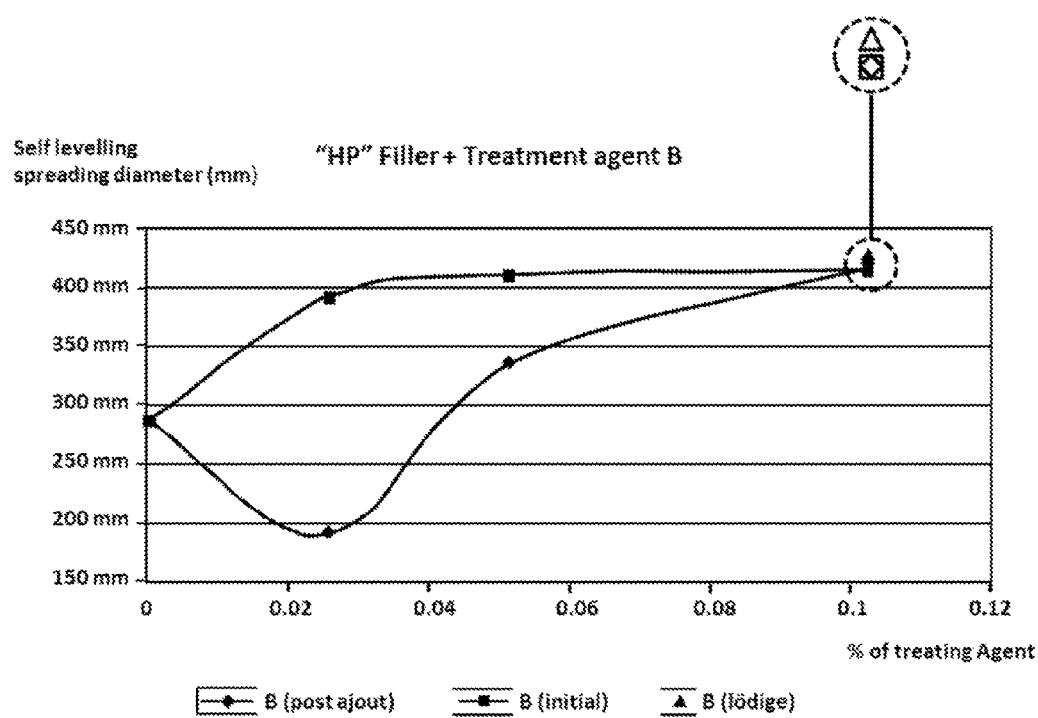
FIG. 5: correspond to a surface treatment with the superplastifier B described above at a dosage of such as expressed in the corresponding Table 5.
Figure 6:
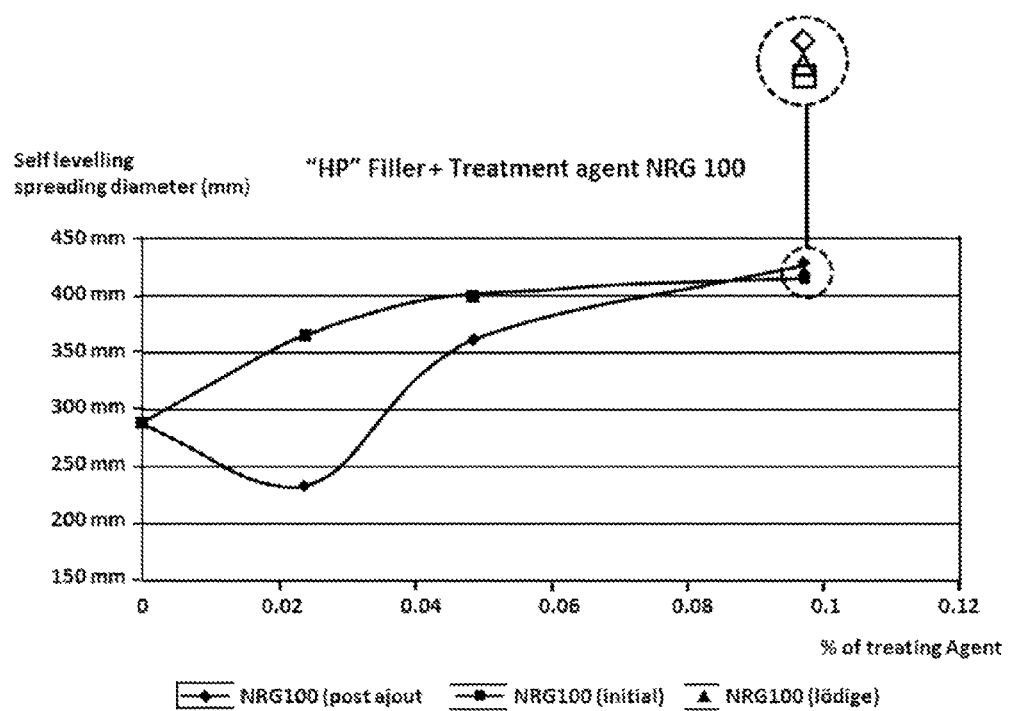
FIG. 6: correspond to a surface treatment by the product NRG 100 at a dosage such as expressed in the corresponding Table 6.

Tables 4, 5, 6 and FIG. 4, 5, 6:

The principle and the procedures are the same as in Tables 1-3 and corresponding FIGS. 1-3.

We attach Tables 4, 5 and 6 (corresponding to FIGS. 4, 5 and 6), representing the same trials as above but with a different filler having this time a very good behaviour at the cone test, already 288 mm diameter untreated, and a non-sticky, non-thick and very fluid self-levelled cone or "galette".

TABLE 4

| | "HP" Filler | | | | | | | |
|---|---|---|---|---|---|---|---|---|
| Test N° | 2312/A | 2312/A1 | 2312/A2 | 2312/A3 | 2312/A10 | 2312/A11 | 2239/3b | 2312/A17 |
| Treatment Mode | None | post ajout | post ajout | post ajout | initial | initial | initial | lödige 3 min |
| Treatment Agent | None | A | A | A | A | A | A | A |
| Treatment Agent dosage - Dosage unit = weight treatment Agent(s) dry/ weight Calcium Carbonate(s) dry | x | 0.025% | 0.05% | 0.1% | 0.025% | 0.05% | 0.1% | 0.1% |
| "Galette" = diameter obtained in the self-levelling cone test | 288 mm | 235 mm | 361 mm | 426 mm | 367 mm | 400 mm | 414 mm | 416 mm |
| Result Visual Aspect | B1 Compact// Sticky | C1 Homogeneous// Compact | B1 Plastic aspect | A1 Fluid | A1 Fluid | A1 Fluid | A1 Correct Spreading// Settles Plastic Aspect | A1 Fluid but settles |

TABLE 5

| | "HP" Filler | | | | | | | |
|---|---|---|---|---|---|---|---|---|
| Test N° | 2312/A | 2312/A4 | 2312/A5 | 2312/A6 | 2312/A12 | 2312/A13 | 2239/9 | 2312/A18 |
| Treatment Mode | None | post ajout | post ajout | post ajout | initial | initial | initial | lödige 3 min |
| Treatment Agent | None | B | B | B | B | B | B | B |
| Treatment Agent dosage - Dosage unit = | x | 0.025% | 0.05% | 0.1% | 0.025% | 0.05% | 0.1% | 0.1% |

TABLE 5-continued

| | "HP" Filler | | | | | | | |
|---|---|---|---|---|---|---|---|---|
| Test N° | 2312/A | 2312/A4 | 2312/A5 | 2312/A6 | 2312/A12 | 2312/A13 | 2239/9 | 2312/A18 |
| weight treatment Agent(s) dry/ weight Calcium Carbonate(s) dry | | | | | | | | |
| "Galette" = diameter obtained in the self-levelling cone test | 288 mm | 235 mm | 361 mm | 426 mm | 367 mm | 400 mm | 414 mm | 416 mm |
| Result Visual Aspect | B1 Compact// Sticky | D1 Slow Spreading | B1 Plastic aspect | A1 Fluid | A1 Fluid | A1 Fluid but settles | A1 Fluid | A1 Fluid but settles |

TABLE 6

| | "HP" Filler | | | | | | | |
|---|---|---|---|---|---|---|---|---|
| Test N° | 2312/A | 2312/A7 | 2312/A8 | 2312/A9 | 2312/A14 | 2312/A15 | 2312/A16 | 2312/A19 |
| Treatment Mode | None | post ajout | post ajout | post ajout | initial | initial | initial | lödige 3 min |
| Treatment Agent | None | NRG100 | NRG100 | NRG100 | NRG100 | NRG100 | NRG100 | NRG100 |
| Treatment Agent dosage - Dosage unit = weight treatment Agent(s) dry/ weight Calcium Carbonate(s) dry | x | 0.025% | 0.05% | 0.1% | 0.025% | 0.05% | 0.1% | 0.1% |
| "Galette" = diameter obtained in the self-levelling cone test | 288 mm | 235 mm | 361 mm | 426 mm | 367 mm | 400 mm | 414 mm | 416 mm |
| Result Visual Aspect | B1 Compact// Sticky | C1 Homogeneous aspect | A1 Correct spreading// Compact | A1 Fluid// Compact// Settles | A1 Correct Spreading// Compact | A1 Correct Spreading// Compact | A1 Correct Spreading// Compact// Settles | A1 Fluid but settles |

As can be seen, there is a profound difference, for that kind of "good or HP" filler, between the curves corresponding to the two different processes.

However, it can be seen that for both types of curves there exists an upper optimum limit at about 0.1% superplastifier(s) adjuvant/dry cement, while here-again, adjuvant A behaves slightly differently from B and NRG 100.

As said above, it must however be kept in mind that TWO properties MUST be met simultaneously so as to produce a HP or technical quality system:

High consistency that is, roughly speaking, high fluidity/ workability as can be seen via the self levelling test, that is diameter above about 250-300 or better above 320-350 mm (and compacity or density that is little porosity) AND SIMULTANEOUSLY a non sticky, not "thick" (that is, easy to "handle"), not "plastic" (and evidently not "dry") product, with no decantation.

This can be seen from the above six tables.

For example, in Table 1 and 2 (medium (170 mm) filler+A or B superplastifier), one can see that:

tests 2312/B1 and B4, both "post ajout mode": with 0.025% of adjuvant, the obtained system is good in diameter (335 mm) only for 2312/B4 though inferior to a dosage at 0.05% (395 mm) BUT B4 forms a non usable product since it has a "plastic aspect": the second condition is NOT met, while B5 is "fluid" and is usable. To the contrary, B1 has an homogeneous aspect at 0.05% but shows only a 238 mm feature, insufficient.

tests 2312 B10 ("initial" that is "pretreatment mode") and B13 (initial mode too): for the same dosage, 0.025%, the product B Table 2 leads to a better diameter but above all leads to a "fluid" product while B10 (forms only an homogeneous product. At the same dosage, B4 with product B leads to a plastic product.

Among the "initial mode" tests B13 to B16, Table 2, we note that all the systems are fluid, and the difference lies in an increase of the diameter (consistency) with the dosage.

LODIGE: if we compare 2312/B21 (use of a premix in a LODIGE device, at a dosage of 0.1%, and if we compare with an initial mode with no LODIGE, at the same dosage of 0.1%, that is 2248/1 (Table 1), one can see that both are fluid and that the LODIGE brings a slightly lower diameter (435 vs 442 mm) which evidently does not justify the use of the additional equipment LODIGE.

Therefore, the "initial" or "pretreatment" mode is best performed by introducing "simultaneously" the filler(s) and the treatment agent(s) that is at a very close point of addition in terms of location and time.

Each Table and curve can be analysed like above, and the skilled man will be able to use those numerous data, using multiple parameters, different superplastifiers, two different types of filler (one medium at 170 mm consistency, untreated, untreated, the other HP at 280 mm consistency, untreated), and the two process modes, to "build" his own system in view of the above parameters, his specific needs or requirements.

"Mixed-Treatment" Test:

A laboratory test has been performed by duplicating test 2248/1 of Table 1 (treatment dosage 0.1%) except that the treatment has been performed on the filler by adding 50% (0.05%) of the efficient amount of superplastifier A to the whole amount of filler (GCC "medium" quality) and mixing both products in a laboratory mixer, then rapidly introducing the remaining 50% of superplastifier into the kneading or mixing device then introducing 5 s later the filler treated outside by the first 50% of superplastifier A. The diameter in the self levelling test was 392 mm, and the aspect "fluid"; therefore one can consider that a mixed treatment is slightly inferior in diameter, but is clearly part of the invention.

The whole range of addition of the superplastifier(s) (and optionally of the cost-reducing amount of plastifier(s) can therefore, in view of all the above tests and curves, and general information given in this application, be defined as:

From 0.02-0.03-0.05% to 0.08-0.1-0.12-0.15% adjuvant(s)/dry weight of cement
with easy adjustment by the skilled man.

One can see that all the objectives of the invention, that is the needs and requirements of the MODERN INDUSTRY, are met:
- at a low dosage (hence at a low cost) of surface treatment by at least one of the adjuvants described above,
- with no need of using extra equipment,
- medium to poor behaving fillers (rejected in the prior art or treated at unreasonable costs and investments) can be easily upgraded to HP fillers capable of forming with the other usual ingredients
- cement or mortar or concrete compositions or systems which are of the "technical" grade, with a High to very High consistency, above 250, 300, or even above 350 mm in the self levelling standardized test, a High to very High compacity (density), a high to very high % of dry material in the end product, from 87 to 95%, by weight, of dry material in the final, complete system.
- what provides the skilled man not only with the possibility of meeting the most stringent and recent industrial requisites, but also to obtain products featuring for the first time a "regularity" in the properties, that is predictability.

That "regularity" is a novel property which was not reached by far in the prior art, despite the demand by the industry; it is believed, without being tied by a theory, that the process steps and the used superplastifiers are responsible for this "regularity".

The follow-up of the "regularity" is possible by adjusting the dosage of the A and B above surface-treatment products, or by selecting other products as described hereabove, and adjusting the dosage, using the above described test method to ensure that the properties remain constant, what is called "regularity".

Application(s)

The applications are all those commonly using the above described cement, mortar, or concrete compositions or systems.

Cement Products

Those are the products or elements that are known to be manufactured from the above cement, mortar or concrete compositions, in the building industry or any other industry, in a well-known manner.

The invention claimed is:

1. A cement composition comprising (i) cement, (ii) calcium carbonate surface treated with 0.02 to 0.15 wt. %, based on the dry weight of the cement composition, of a treatment agent comprising at least one superplasticizer and at least one plasticizer, wherein the ratio of the superplasticizer and the plasticizer is from 95/5 to 85/15 on a dry weight basis, and wherein the calcium carbonate is surface treated with the treatment agent before being introduced into the cement composition, and (iii) optionally one or more of an aggregate, sand, gravel, a hydraulic binder, an air entrainment agent, a setting retarder, a setting accelerator, an anti-foam agent, an adjuvant, a fluidifier and water.

2. The cement composition according to claim 1, wherein the calcium carbonate is calcium carbonate, ground calcium carbonate, precipitated calcium carbonate or a blend of ground calcium carbonate and precipitated calcium carbonate.

3. The cement composition according to claim 1, wherein the superplasticizer is selected from the group consisting of a polycarboxylate, a polycarboxylate ether, a sulfonated naphthalene condensate, and a sulfonated melamine formaldehyde.

4. The cement composition according to claim 1, wherein the superplasticizer is a polycarboxylate or a polycarboxylate ether.

5. The cement composition according to claim 1, wherein at least 80% of the surface of particles of calcium carbonate is covered with the at least one superplasticizer.

6. The process according to claim 1, wherein at least 90% of the surface of particles of calcium carbonate is covered with the at least one superplasticizer.

7. The cement composition according to claim 1, wherein 100% of the surface of particles of calcium carbonate is covered with the at least one superplasticizer and the plasticizer.

8. The cement composition according to claim 1, containing 0.3 to 3 kg of the at least one superplasticizer per 100 kg of the cement composition.

9. The cement composition according to claim 1, containing 0.8 to 1.2 kg of the at least one superplasticizer per 100 kg of the cement composition.

10. The cement composition according to claim 1, further comprising an aggregate, a hydraulic binder, an air entrainment agent, a setting retarder, a setting accelerator, an anti-foam agent, an adjuvant, and a fluidifier.

11. The cement composition according to claim 1, further comprising an aggregate, a hydraulic binder, an air entrainment agent, a setting retarder, a setting accelerator, an anti-foam agent, an adjuvant, a fluidifier, and water.

12. The cement composition according to claim 1, further comprising an aggregate, sand, a hydraulic binder, an air entrainment agent, a setting retarder, a setting accelerator, an anti-foam agent, an adjuvant, and a fluidifier.

13. The cement composition according to claim 1, further comprising an aggregate, sand, a hydraulic binder, an air entrainment agent, a setting retarder, a setting accelerator, an anti-foam agent, an adjuvant, a fluidifier and water.

14. The cement composition according to claim 1, further comprising an aggregate, sand, gravel, a hydraulic binder, an air entrainment agent, a setting retarder, a setting accelerator, an anti-foam agent, an adjuvant, and a fluidifier.

15. The cement composition according to claim 1, further comprising an aggregate, sand, gravel, a hydraulic binder, an air entrainment agent, a setting retarder, a setting accelerator, an anti-foam agent, an adjuvant, a fluidifier and water.

16. The cement composition according to claim 2, further comprising an aggregate, a hydraulic binder, an air entrainment agent, a setting retarder, a setting accelerator, an anti-foam agent, an adjuvant, and a fluidifier.

17. The cement composition according to claim 2, further comprising an aggregate, a hydraulic binder, an air entrainment agent, a setting retarder, a setting accelerator, an anti-foam agent, an adjuvant, a fluidifier, and water.

\* \* \* \* \*